United States Patent
Taylor et al.

(10) Patent No.: US 10,181,903 B2
(45) Date of Patent: Jan. 15, 2019

(54) OPTICAL RESONATORS HAVING NOISE MARGINS

(71) Applicant: Facebook, Inc., Menlo Park, CA (US)

(72) Inventors: Jason Taylor, Berkeley, CA (US); Narsing Vijayrao, Santa Clara, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/285,382

(22) Filed: Oct. 4, 2016

(65) Prior Publication Data
US 2017/0099106 A1   Apr. 6, 2017

Related U.S. Application Data

(60) Provisional application No. 62/237,338, filed on Oct. 5, 2015.

(51) Int. Cl.
*H04B 10/25* (2013.01)
*H04B 10/50* (2013.01)
*H04B 10/572* (2013.01)
*H04B 10/66* (2013.01)
*H04Q 11/00* (2006.01)

(52) U.S. Cl.
CPC ....... *H04B 10/2504* (2013.01); *H04B 10/502* (2013.01); *H04B 10/572* (2013.01); *H04B 10/66* (2013.01); *H04Q 11/0005* (2013.01); *H04Q 2011/0018* (2013.01)

(58) Field of Classification Search
CPC .......... H04B 10/2504; H04B 10/502; H04B 10/572; H04B 10/66; H04Q 11/0005; H04Q 2011/0018
See application file for complete search history.

(56) References Cited

U.S. PATENT DOCUMENTS

| | | | | |
|---|---|---|---|---|
| 6,734,411 | B1* | 5/2004 | Imbsei | H04B 10/077 250/205 |
| 7,113,708 | B1* | 9/2006 | Creaney | H04L 25/4917 398/140 |
| 2010/0188735 | A1* | 7/2010 | Tamaoki | G02B 6/2551 359/341.3 |
| 2013/0195450 | A1* | 8/2013 | Ashwood-Smith | H04Q 11/0005 398/49 |

OTHER PUBLICATIONS

Recommendation ITU-T G.694.1 (Feb. 2012) Series G: Transmission Systems and Media, Digital Systems and Networks Transmission media and optical systems characteristics—Characteristics of optical systems Spectral grids for WDM applications: DWDM frequency grid.*
U.S. Appl. No. 15/688,802 by Grubb, S., et al., filed Aug. 28, 2017.

* cited by examiner

*Primary Examiner* — Mina Shalaby
(74) *Attorney, Agent, or Firm* — Van Pelt, Yi & James LLP

(57) ABSTRACT

Optical communication using optical resonators with noise margins is disclosed. A representative system includes an optical fiber for transmitting optical signals, a receiver configured to receive the optical signals, and a plurality of optical resonators optically connecting the optical fiber to the receiver. The individual optical resonators can have peak sensitivities at mutually different wavelengths of light. In some embodiments the optical resonators can be Q-switches.

21 Claims, 4 Drawing Sheets

OPTICAL RESONATORS HAVING NOISE MARGINS

CROSS-REFERENCE TO RELATED APPLICATIONS

This application claims the benefit of U.S. Provisional Patent Application No. 62/237,338, entitled "OPTICAL RESONATORS HAVING NOISE MARGINS," filed on Oct. 5, 2015, which is incorporated herein by reference in its entirety.

TECHNICAL FIELD

This disclosure is generally related to the field of optical communication, and more specifically to the field of improving signal intensity of optical signals at a signal receiver.

BACKGROUND

Optical communication systems transfer signals from a transmitter (TX) of one system to a receiver (RX) of another system. In general, optical signals can be transmitted through an optical fiber at relatively high data rates and low signal attenuation therefore making such data transmission suitable for, e.g., telephony, Internet, and cable television.

FIG. 1 schematically illustrates a conventional optical communication system 10. A source of light 12 (e.g., a laser, a light emitting diode, etc.) emits light 14 that is directed to one end of an optical fiber 16 via a transmitter (not shown). Due to relatively low signal attenuation, the optical fiber can transfer signals over long distances, e.g., tens or hundreds of kilometers. At the other end of the optical fiber 16, the transferred light 18 is received by an RX 20.

Typically, the RX 20 is tuned to receive the optical signals at a particular incoming wavelength, e.g., the wavelength $\lambda_0$ of the source of light 12. However, in some practical applications the wavelength at which light is emitted by the source of light varies, e.g., because of temperature variations of the source of light 12. For example, the source of light 12 may emit at a wavelength $\lambda_0$ when at temperature $T_0$, and at a wavelength $\lambda_1$ when at temperature $T_1$. The difference between the expected wavelength $\lambda_0$ and the received wavelength $\lambda_1$ at the RX can degrade performance of the optical communication system, especially for telecommunication equipment that should operate reliably within a relatively wide temperature range of 0° C.-80° C. Therefore, some conventional technologies use specialized lasers capable of producing highly stable wavelengths even over a relatively wide range of temperatures. However, such specialized telecommunication lasers may be too expensive for lower cost applications, e.g., data center applications.

Other conventional technologies rely on the calibration of the RX to better match the wavelength of the incoming light to a peak sensitivity of the RX. However, calibration causes downtime, therefore resulting in reduced availability of these conventional systems. Accordingly, there remains a need for relatively low cost and high availability systems having good sensitivity to the wavelengths emitted by a light source over a range of temperatures.

DETAILED DESCRIPTION

Figure 1:
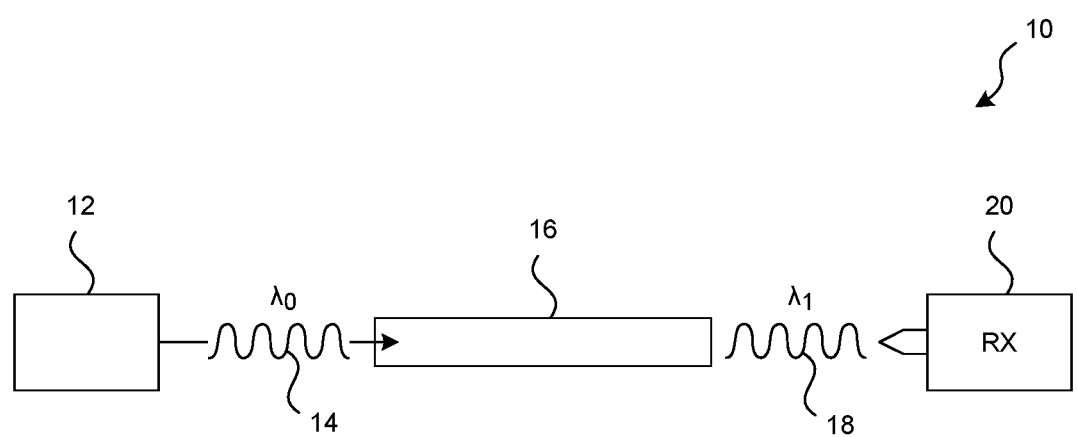
FIG. 1 is an optical communication system 10 according to prior art.

Specific details of several embodiments of representative optical data communication systems and methods are described below. The embodiments are directed to improved matching between wavelengths of optical signals and a peak sensitivity of an optical resonator at a receiver (RX).

At a transmitter (TX) side of an optical fiber, optical signals are typically generated by lasers, light emitting diodes (LEDs) or other light sources having a relatively narrow frequency/wavelength band (e.g., the optical signals are centered around a wavelength $\lambda_0$). At the RX side of the optical fiber, the optical signals are directed to the RX using, e.g., optical resonators having peak sensitivities (e.g., a natural frequency or a bandpass frequency of the optical resonator) that correspond to the expected wavelength $\lambda_0$ of the incoming optical signal. However, as the temperature of the light source (e.g., a laser) changes, the light source may emit light at changing wavelengths too. As a result, the optical signals at the optical resonator may have a wavelength/frequency that differs from the wavelength/frequency that the optical resonator is optimally designed for. Furthermore, other environmental factors may affect the wavelength/frequency of the optical signals at the optical resonator. For example, temperature variability of the optical fiber, causing variability in the optical fiber density, can also affect the wavelength/frequency of the optical signal at the RX. Therefore, in some embodiments, several optical resonators can be optically coupled to the optical fiber at the RX, and can direct the optical signals to the RX. The optical resonators can have individual peak sensitivities that are distributed around an expected $\lambda_0$, e.g., 0.7*$\lambda_0$, 0.8*$\lambda_0$, 0.9*$\lambda_0$, $\lambda_0$, 1.1*$\lambda_0$, 1.2*$\lambda_0$, and 1.3*$\lambda_0$, and thereby have an increased probability that the peak sensitivity of at least one optical resonator is sufficiently close to a peak wavelength of the incoming optical signal. As a result, the probability of routing a sufficiently strong signal to the RX also increases. In these embodiments, the optical resonator receiving the strongest (the highest intensity) signal may be selected and the other optical resonators may be ignored, e.g., until they receive the strongest signal.

In some embodiments, the optical resonators may be tunable to adjust their peak sensitivities closer to the peak wavelength of the optical signals at the RX. The tuning may be based on the intensity measurements of signals that the optical resonators direct to the RX. In some embodiments, the optical resonators may be turned off if their peak sensitivity is relatively distant (in a wavelength or a frequency domain) from the peak wavelength of the optical signals.

As would be recognized by persons having ordinary skill in the art, using resonators can be more efficient than using filters because resonators are "analog" rather than "digital," and a smaller set of resonators can be tuned up and down a lambda (wavelength) curve to lock onto an appropriate lambda (wavelength). On the other hand, filters are typically digital and a much larger set of filters can be needed to lock onto small variations in lambdas. In the disclosed design, data can be transmitted on multiple wavelengths (e.g., in a manner similar to dense wavelength division multiplexing), and so the resonators can be used to lock onto multiple wavelengths.

Figure 2:
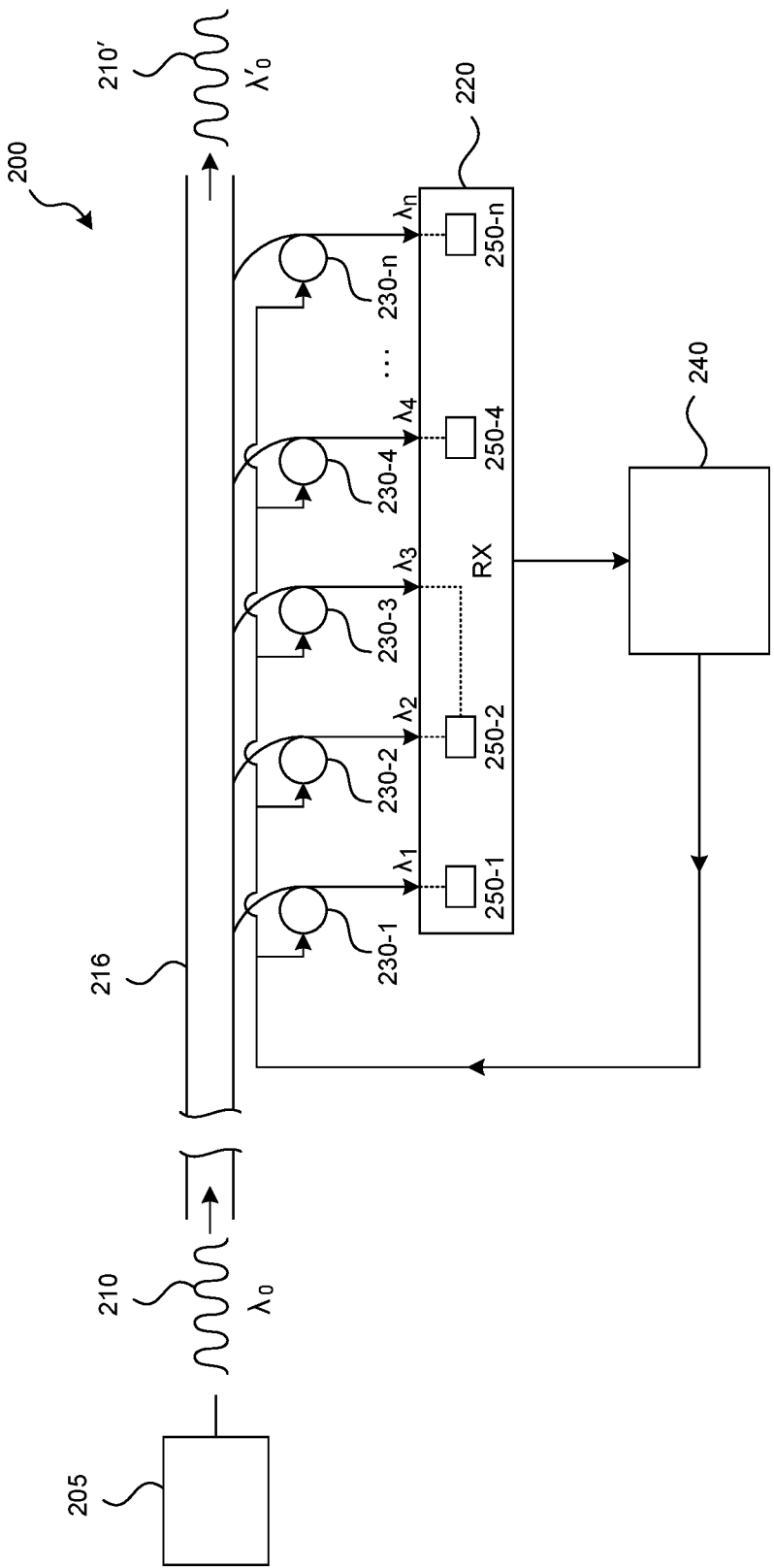
FIG. 2 is a schematic diagram illustrating an optical communication system in accordance with an embodiment of the present technology.

FIG. 2 is a diagram illustrating a schematic view of an optical communication system 200 in accordance with an embodiment of the present technology. In the illustrated embodiment, a TX 205 emits optical signal 210 at the wavelength $\lambda_0$ (also referred to as a "peak wavelength"). The TX 205 may include a laser, an LED or other source of light capable of emitting narrow-band optical signals. In some embodiments, the TX 205 may emit optical signals at multiple wavelengths. For example, different streams of data may be carried using optical signals at different wavelengths $\lambda$. Due to, for example, temperature-induced variability in the wavelength of the emitted light, the wavelength of the optical signals 210/210' may shift from a wavelength $\lambda_0$ to a wavelength $\lambda_0'$.

The optical signals propagate through the optical fiber 216 and can be routed to the RX 220 through optical resonators 230-1 to 230-$n$. In some embodiments, a distance between the TX 205 and the RX 220 (generally corresponding to the length of the optical fiber 216) can be at the order of magnitude of several kilometers or tens of kilometers. In some embodiments, the optical resonators can be Micro Electro Mechanical (MEMS) based Q-switches. Individual optical resonators 230-$i$ typically operate as a filter having a relatively narrow wavelength/frequency bandpass, e.g., the optical resonators 230-1 to 230-$n$ have corresponding peak sensitivities $\lambda_1$ to $\lambda_n$. Therefore, in some embodiments, all optical resonators 230-1 to 230-$n$ route optical signals to the RX 220, but the intensity of the routed optical signals will generally be higher for those optical resonators 230-$i$ having peak sensitivities closer to the wavelength $\lambda_0'$ of the optical signal at the RX 220. As explained above, the peak wavelength of the optical signals emitted by the TX 205 can vary with, for example, a variable ambient temperature causing variability in the temperature of the source of light.

In some embodiments, it may be desirable to turn off those optical resonators 230-$i$ having peak sensitivity that is distant from the peak wavelength $\lambda_0'$. For example, the intensity of the optical signals routed by the optical resonators 230-1 to 230-$n$ can be measured by light intensity (signal intensity) sensors 250-1 to 250-$n$. In some embodiments, a single light intensity sensor can be configured to measure the intensity of the optical signals from multiple optical resonators. Conversely, multiple light intensity sensors can measure the intensity of the optical signals from a single optical resonator, e.g., to improve accuracy of the measurements. In some embodiments, a controller 240 can turn off those optical resonators 230-$i$ that produce light intensity below a threshold because the peak sensitivities of these optical resonators is not sufficiently close to $\lambda_0'$. In some embodiments, all optical resonators except one can be turned off, for example, to reduce wear and tear on the resonators. Generally, the RX 220 operates on optical signals routed by one or more optical resonators capable of producing relatively high intensity of optical signals.

In some embodiments, multiple data streams of the optical signals can be carried at multiple wavelengths/frequencies through the optical fiber 216 (e.g., wavelength-division multiplexing (WDM)). At the RX, the optical signals at different wavelengths can be routed using several groups of the optical resonators having the peak sensitivities distributed around the expected peak wavelengths for the multiple data streams.

Figure 3:
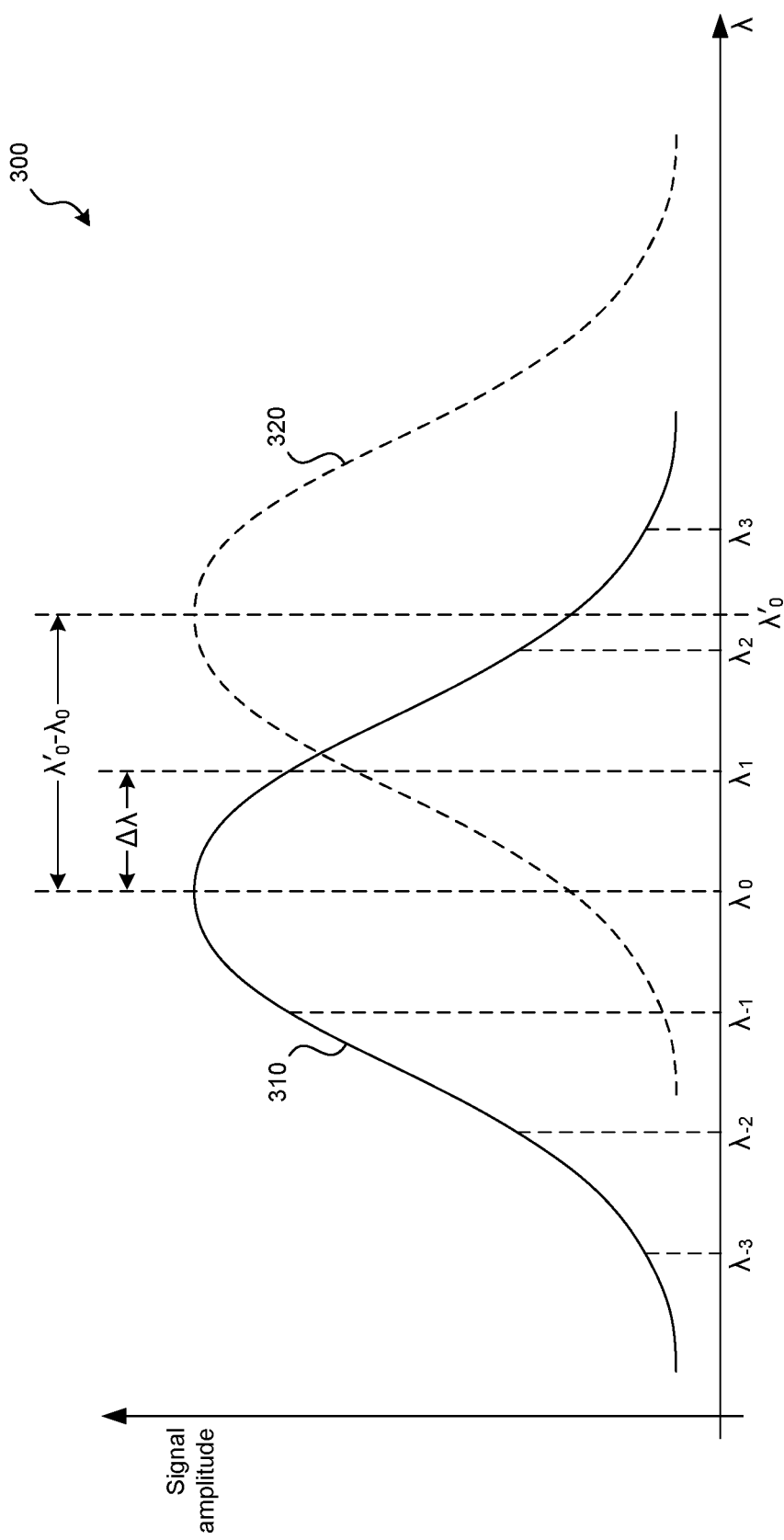
FIG. 3 is a graph diagram illustrating a distribution of signal intensity over the optical resonators having different peak sensitivities in accordance with an embodiment of the present technology.

FIG. 3 is a graph diagram illustrating a distribution of signal intensity over the optical resonators having different peak sensitivities in accordance with an embodiment of the present technology. The horizontal axis of the illustrated graph 300 represents the wavelength of the optical signals. The vertical axis represents the amplitude of the optical signals. An expected distribution of signal amplitudes per wavelengths can be represented by curve 310. For example, curve 310 can chart a nominal distribution of the signal amplitude as expected in absence of deviations caused by temperature variations of the laser. The expected distribution of curve 310 is centered around the wavelength $\lambda_0$ and the wavelengths $\lambda_{-3}, \lambda_{-2}, \ldots \lambda_3$ are offset from the $\lambda_0$. In some embodiments, the offset ($\Delta\lambda$) between the peak sensitivities of the adjacent optical resonators can be, e.g., 10% of $\lambda_0$ (i.e., $\lambda_{-3}=0.7*\lambda_0$, $\lambda_{-2}=0.8*\lambda_0$, $\lambda_{-1}=0.9*\lambda 0$, $\lambda_1=1.1\lambda_0$, $\lambda_2=1.2\lambda_0$, $\lambda_3=1.3\lambda_0$, etc.). Other offsets are also possible and the offsets need not be uniform for all $\lambda_i$'s. For example, $\Delta\lambda$ can be smaller for the $\lambda$'s that are closer to the $\lambda_0$ and larger for the $\lambda$'s that are away from the $\lambda_0$. Generally, the optical resonators illustrated in FIG. 2 may have peak sensitivities that correspond to $\lambda_i$'s.

Curve 320 corresponds to a distribution of signal amplitudes per wavelengths for the optical signals received at the RX. The illustrated distribution 320 centers around the wavelength $\lambda_0'$. In the illustrated example, the optical resonator having the peak sensitivity $\lambda_2$ is the most sensitive to the optical signals at $\lambda_0'$ because $\lambda_2$ is closest in the axis to $\lambda_0'$. Therefore, the optical resonator that has the peak sensitivity $\lambda_2$ may be selected by the RX or the controller to provide optical signals for further processing. As explained above, in some embodiments, the optical resonator can be tunable such that its peak sensitivity (e.g., $\lambda_2$) can be tuned even closer to $\lambda_0'$.

Figure 4:
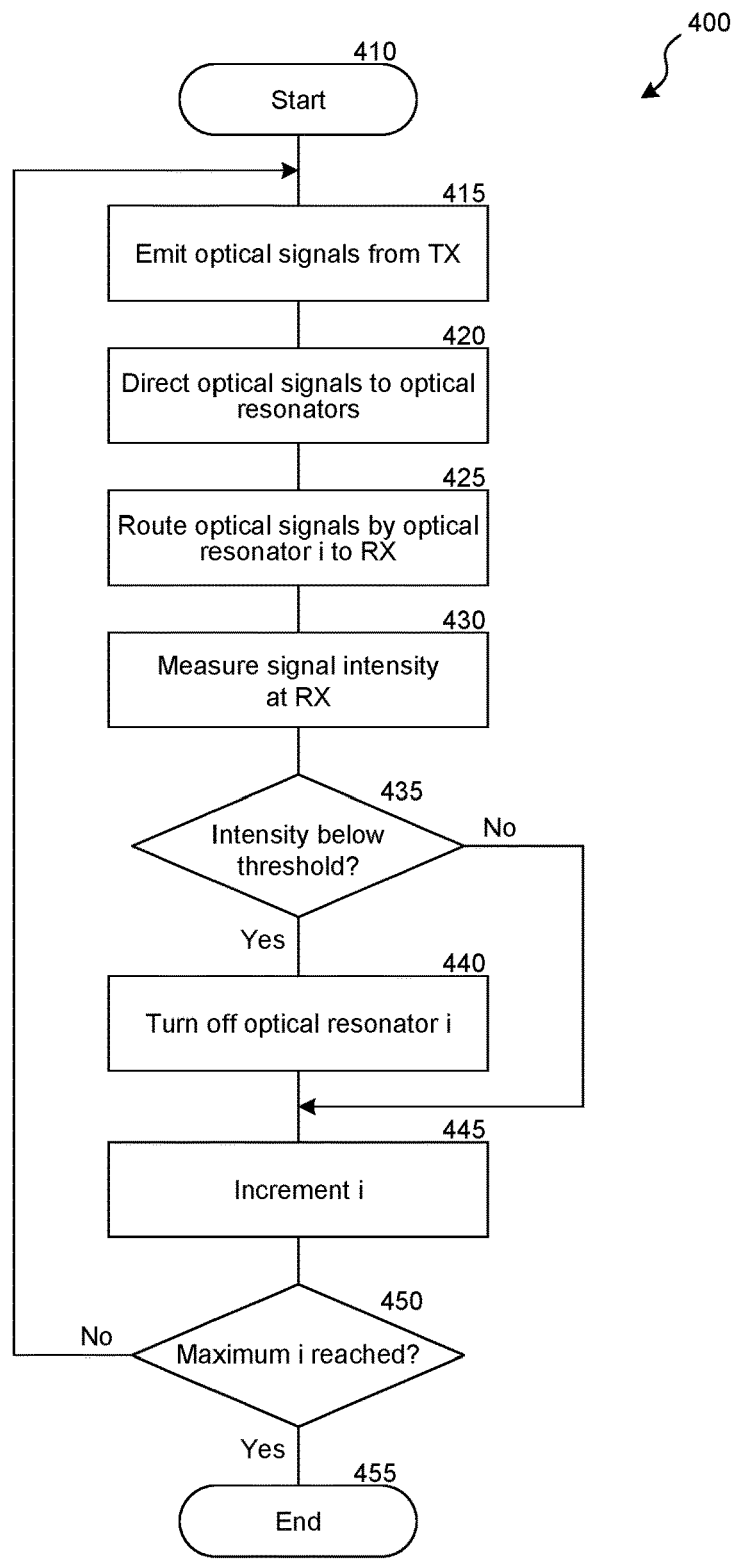
FIG. 4 is a flow diagram illustrating a method for selecting the optical resonators based on a threshold sensitivity in accordance with an embodiment of the present technology.

FIG. 4 is a flow diagram illustrating a method 400 for selecting optical resonators based on a threshold sensitivity in accordance with various embodiments. In some embodiments, the method 400 can be implemented using the system described in FIG. 2.

The method 400 starts at step 410. In step 415, the RX receives, e.g., via an optical fiber, optical signals generated by a source of light (e.g., a laser) at a TX. The optical fiber can be a single strand or a multiple strand. Generally, the source of light emits a narrow-band light, but the peak wavelength/frequency of the optical signals may deviate from the nominal value, e.g., due to changing temperature of the laser or of the optical fiber.

In step 420, the optical signals are directed to optical resonators. In step 425, an optical resonator routes optical signals to the RX. The optical resonator may have a peak sensitivity (e.g., a resonant frequency) corresponding to one of $\lambda$'s illustrated in FIG. 3.

In step 430, one or more light intensity sensors measure signal intensity at the optical resonator output. In general, the optical resonators having peak sensitivity closer to $\lambda_0'$ will output optical signals having higher intensity. In step 435, the signal intensity measurements can be compared to a threshold value. If the signal intensity for a particular optical resonator is below the threshold, the optical resonator can be turned off in step 440. Otherwise, the method proceeds to step 445 where the index i is incremented.

In step 450, the system verifies whether the maximum i (the maximum number of the optical resonators) has been reached. If the maximum has not been reached, the method returns to step 415 and repeats some or all of the steps of method 400. Otherwise, if the maximum number of the optical resonators has been reached, the method ends in step 455. In some embodiments, the foregoing method may not include all the above steps, or may include steps in addition to those illustrated in FIG. 4. Upon completing this method, the system can process received signals.

From the foregoing, it will be appreciated that specific embodiments of the invention have been described herein for purposes of illustration, but that various modifications may be made without deviating from the scope of the various embodiments of the invention. For example, in some embodiments optical signals may be transmitted through air or vacuum instead of or in addition to the optical fiber. Furthermore, while various advantages and features associated with certain embodiments of the disclosure have been described above in the context of those embodiments, other embodiments may also exhibit such advantages and/or features, and not all embodiments need necessarily exhibit such advantages and/or features to fall within the scope of the disclosure. Accordingly, the disclosure is not limited, except as by the appended claims.

We claim:

1. An optical communication system, comprising:
   an optical fiber for carrying transmitted optical signals;
   a receiver (RX) configured to receive the optical signals;
   a plurality of optical resonators optically connecting the optical fiber with the RX, wherein individual optical resonators have peak sensitivities at different wavelengths of light; and
   a controller configured to select optical signals provided by an optical resonator of the plurality of optical resonators to represent the transmitted optical signals based on characteristics of the optical signals provided by the optical resonator, wherein the optical signals selected based on the characteristics of the optical signals themselves are provided as selected output signals representing the transmitted optical signals with reduced noise.

2. The system of claim 1, further comprising:
   a signal intensity sensor optically connected to at least one optical resonator of the plurality of optical resonators;
   wherein the controller is further configured to receive an output from the signal intensity sensor and to turn off the at least one optical resonator of the plurality of optical resonators based on the output of the signal intensity sensor.

3. The system of claim 1, wherein the optical resonators are Q-switches.

4. The system of claim 1, wherein the optical resonators are tunable.

5. The system of claim 1, further comprising a transmitter (TX) in optical communication with the optical fiber, wherein the TX transmits optical signals.

6. The system of claim 5, further comprising a laser in optical communication with the optical fiber.

7. The system of claim 5, further comprising a light emitting diode (LED) in optical communication with the optical fiber.

8. The system of claim 1, wherein the optical signals propagate from a first portion of the optical fiber to a second portion of the optical fiber, wherein the second portion of the optical fiber is connected to one or more optical resonators, and wherein a peak wavelength of the optical signal at the first portion is different from the peak wavelength of the optical signal at the second portion.

9. The system of claim 8, wherein the peak sensitivities of individual optical resonators correspond to a fraction of the peak wavelength of the optical signals at the first portion.

10. A method for optical communication, comprising:
    routing optical signals from an optical fiber to a receiver (RX) via a plurality of optical resonators optically connected to the optical fiber, wherein at least some of the plurality of optical resonators have peak sensitivities at different wavelengths of light;
    causing the optical signals to be received by the RX; and
    selecting optical signals provided by an optical resonator of the plurality of optical resonators to represent the transmitted optical signals, the selecting based on characteristics of the optical signals provided by the optical resonator, wherein the optical signals selected based on the characteristics of the optical signals themselves are provided as selected output signals representing the transmitted optical signals with reduced noise.

11. The method of claim 10, further comprising:
    measuring a signal intensity of the optical signals routed by the plurality of optical resonators;
    determining whether the signal intensity is above a threshold signal intensity; and
    based on the determining whether the signal intensity is above the threshold signal intensity, turning off at least one optical resonator of the plurality of optical resonators.

12. The method of claim 10, wherein the optical resonators are Q-switches.

13. The method of claim 10, wherein the optical signals enter the optical fiber at a first portion, and wherein the peak sensitivities of individual optical resonators correspond to a peak wavelength or a 10% increment or a 10% decrement of the optical signals wavelength at the first portion.

14. The method of claim 10, wherein the optical resonators have peak sensitivities that cluster around a nominal peak wavelength of the optical signals.

15. The method of claim 10, wherein the optical fiber is a multiple-strand optical fiber.

16. A method for manufacturing an optical system, comprising:
    connecting a plurality of optical resonators with an optical fiber configured to transmit optical signals, wherein individual optical resonators have peak sensitivities at different wavelengths of light;
    connecting a receiver (RX) to the plurality of optical resonators; and
    connecting a controller to the receiver to select optical signals provided by an optical resonator of the plurality of optical resonators to represent the transmitted optical signals based on characteristics of the optical signals provided by the optical resonator, wherein the optical system is configured to provide the optical signals selected based on the characteristics of the optical signals themselves as selected output signals representing the transmitted optical signals with reduced noise.

17. The method of claim 16, further comprising:
    connecting a signal intensity sensor to at least one optical resonator of the plurality of optical resonators;
    wherein the controller is configured to receive an output from the signal intensity sensor and to turn off the at least one optical resonator of the plurality of optical resonators based on the output of the signal intensity sensor.

18. The method of claim 16, wherein the optical resonators are tunable.

19. The method of claim 16, wherein the optical resonators have peak sensitivities in increments of +/−10% of a nominal peak wavelength of the optical signals.

20. The method of claim 16, wherein the optical fiber is a single-strand optical fiber.

21. The optical communication system of claim 1, wherein the characteristics include a light intensity of the optical signals provided by the optical resonator.

* * * * *